United States Patent [19]

Shih

[11] Patent Number: 5,081,422
[45] Date of Patent: Jan. 14, 1992

[54] METHODS FOR ROOF, WALL OR FLOOR LEAK DETECTION

[76] Inventor: Ishiang Shih, 3300 Bahama St., Brossard, Quebec, Canada, J4Z 2R4

[21] Appl. No.: 579,034

[22] Filed: Sep. 7, 1990

[51] Int. Cl.⁵ .................................................. G08B 21/00
[52] U.S. Cl. ........................................ 324/693; 73/40; 340/605
[58] Field of Search .............. 324/694, 693, 724; 73/40, 49.2; 340/605; 174/11 R

[56] References Cited

U.S. PATENT DOCUMENTS

| | | | |
|---|---|---|---|
| 3,383,863 | 5/1968 | Berry | 340/605 X |
| 4,404,516 | 9/1983 | Johnson, Jr. | 340/605 X |
| 4,598,273 | 7/1986 | Bryan, Jr. et al. | 340/605 X |
| 4,965,554 | 10/1990 | Darling | 73/40 X |

FOREIGN PATENT DOCUMENTS

2151137  4/1973  Fed. Rep. of Germany ...... 340/605

*Primary Examiner*—Hezron E. Williams
*Assistant Examiner*—Joseph W. Roskos

[57] ABSTRACT

The present invention describes a method to detect leaks in a roof or leaks in basement walls or floors of a building. The detection is achieved by placing a two wire detector in the region to be monitored and measuring the current with a voltage applied across the two wires. The location of the leak is determined by placing several wire detector pairs in a mesh fashion and then scanning the leakage current through each wire pair. A complete detection and scanning system is also described.

24 Claims, 7 Drawing Sheets

METHODS FOR ROOF, WALL OR FLOOR LEAK DETECTION

BACKGROUND OF THE INVENTION

In modern houses and buildings, water sometime leaks through a roof, a basement wall or a floor. The leakages occur when the shingles, roof tar or tar-sand paper deteriorates or when the basement walls or floor crack. This may not be noticed right away until water leaks through the roof or extends to a visible region. It is advantageous to detect the leak early since the presence of water on the roof or floor results in deterioration of the roof or floor construction materials and may lead to accumulation of moisture and bacteria which are harmful to the human body. Even when the leak is discovered, it is still difficult to identify its actual location. For example, it is often require to remove a large area of the floor or wall decoration and insulation for a finished basement in order to identify the location of the leak. From the above comment, it is clear that there is a need to develop a method and a system to detect moisture or water in the early stage of the leak and to identify the location of the leak. In the present invention, a method is described which detects the electrical resistance between or current through two wires and indicates whether water leak is present. Ordinary rain water or city water contains ions of various elements. These ions migrate with the application of a voltage. Thus when a voltage is applied to water-covered or water-soaked construction materials, a current will be allowed to flow. This current will be used to sense and to identify the leak.

OBJECTS AND STATEMENT

One object of the present invention is to provide a method to detect water leaks in roofs, basement walls or floors.

Another object of the present invention is provide a method to identify the location of leaks in roofs, basement walls or floors.

DESCRIPTION OF PREFERRED EMBODIMENTS

Figure 1:
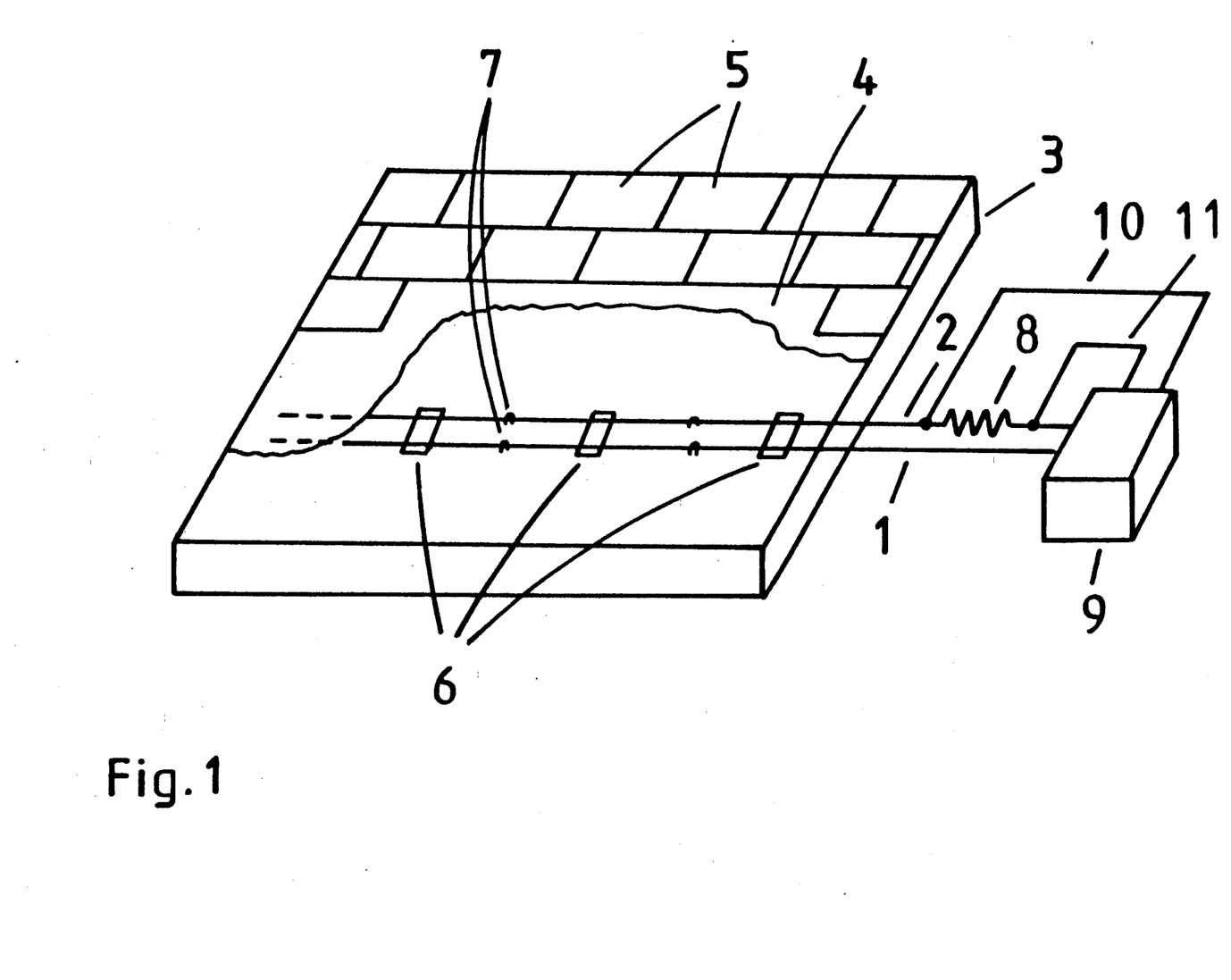
FIG. 1 shows a two wire leak detector mounted on a roof and connected to a constant voltage source. The voltage across the resistor is measured to determine the leak.

The present invention relates to the detection method for the water leak in a roof or a basement wall or floor. FIG. 1 illustrates an arrangement for the leak detection system. Two conduction wires (1 and 2) are mounted on the plywood (3) which is used to support the tar paper (4) and the shingles (5). The distance between the two conducting wires (1 and 2) is kept constant by insulated wire spacers (6). The two conducting wires are held against the plywood by metallic pins (7). Wire (2) is connected to a current sensing resistor (8) one terminal of which and wire (1), the common wire, are connected to an electrical power source and monitor unit (9). The electrical power source and monitor unit (9) consists of a dc voltage supply and a voltage sensing circuit. The voltage sensing circuit measures the voltage across the sensing resistor (8) through wires (10) and (11). When the plywood is dry and without any water on the plywood, the resistance between the two wires (1 and 2) will be very high. Hence there will be no current when a voltage is applied and the voltage across the sensing resistor will be low. When there is water leak in the region where the sensing wires are mounted, the resistance between the two wires will be low. Hence a finite electrical current will flow between the wires when a dc voltage is applied. This finite current will also flow through the sensing resistor (8) and develop a dc voltage across it. This voltage is measured by the voltage sensing circuit which gives a warning signal for the roof leak.

Figure 2:
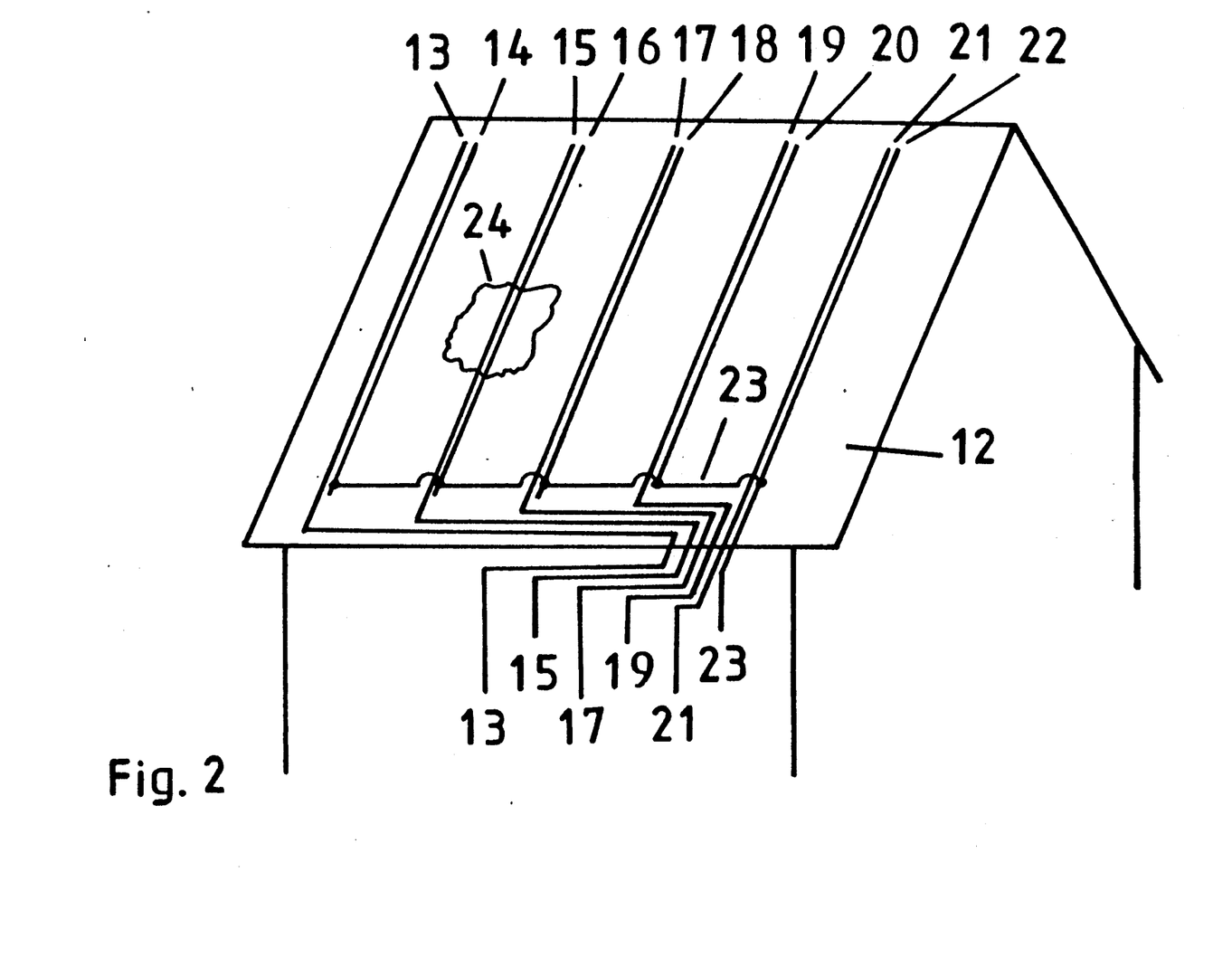
FIG. 2 shows a parallel two wire detector arrangement running along one side of the roof for determining the horizontal position of the leak.

To cover the entire roof area and to locate the horizontal position of the leak, a leak detection system with multiple sensing wires can be used. FIG. 2 shows a wire detection system with 5 pairs of detection wires mounted on one side of the roof (12). The following pairs of wires form the detection system: (13,14), (15,16), (17,18), (19,20) and (21,22). The distance between the two wires in each pair and the distance between adjacent pairs is kept constant. To simplify the wiring, one of the wires in each pair (14, 16, 18, 20 and 22) is connected to a common wire (23). The detection of the horizontal position of the leak on the roof is achieved by measuring separately the resistance between the following pairs: (13,23), (15,23), (17,23), (19,23) and (21,23). When it is raining, if the plywood of the roof is dry and if there is no water leak, the resistances between the pairs will be high and the voltage across the sensing resistor (8) (see FIG. 1) will be low. In the leak detection, a detection circuit similar to that in FIG. 1 is used. Here the measurements of voltages across individual wire pair are made by connecting the sensing resistor, the dc power source and the sensing circuit to the pair either manually or electronically. If water is present in the region (24), the resistances between the pair (13,23), (17,23), (19,23) and (21,23) will be high. The resistance between the pair (15,23) which is through the leak region (24) will be low. Therefore, the horizontal position of the leak can be found from the position of the sensing wire pair (15,16) or (15,23).

Figure 3:
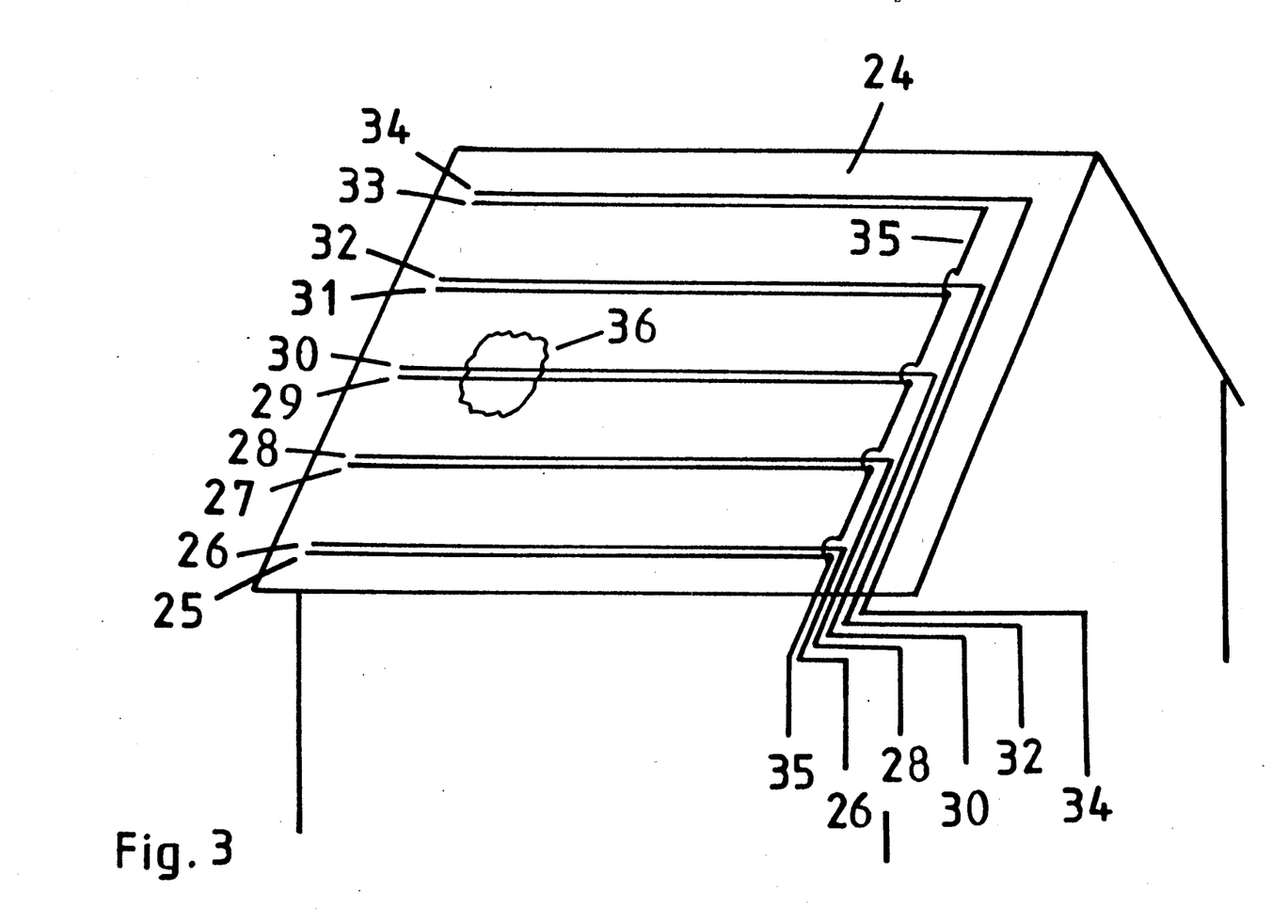
FIG. 3 shows a two wire detector arrangement running across one side of the roof for determining the vertical position of the leak.

To cover the entire roof area and to locate the vertical position of the leak, a leak detection system with multiple sensing wires similar to that described in FIG. 2 can be used. FIG. 3 shows a wire detection system with 5 pairs of detection wires mounted along one side of the roof (24). The following pairs of wires form the detection system: (25,26), (27,28), (29,30), (31,32) and (33,34). The distance between the two wires in each pair and the distance between adjacent pairs are as in FIG. 2. One of the wires in each pair (25, 27, 29, 31 and 33) is connected to a common wire (35) to simplify the wiring. The detection of the vertical position of the leak on the roof is achieved by measuring separately the resistance between the following pairs: (26,35), (28,35), (30,35), (32,35) and (34,35). If the plywood of the roof is dry and if there is no water leak, the resistances between the pairs will be high and the voltage across the sensing resistor (8) (see FIG. 1) will be low. A detection circuit similar to that in FIG. 1 is used. Here measurements of voltages across individual wire pairs are made by connecting the sensing resistor, the dc power source and the sensing circuit to the pair either manually or electronically. If water is present in region (36), the resistances across the following pairs (26,35), (28,35), (32,35) and (34,35) will be high. The resistance between pair (30,35) through the leak region (36) will be low. Therefore, the vertical position of the leak on the roof can be found from the vertical position of the sensing wire pair (29,30) or (29,35).

Figure 4:
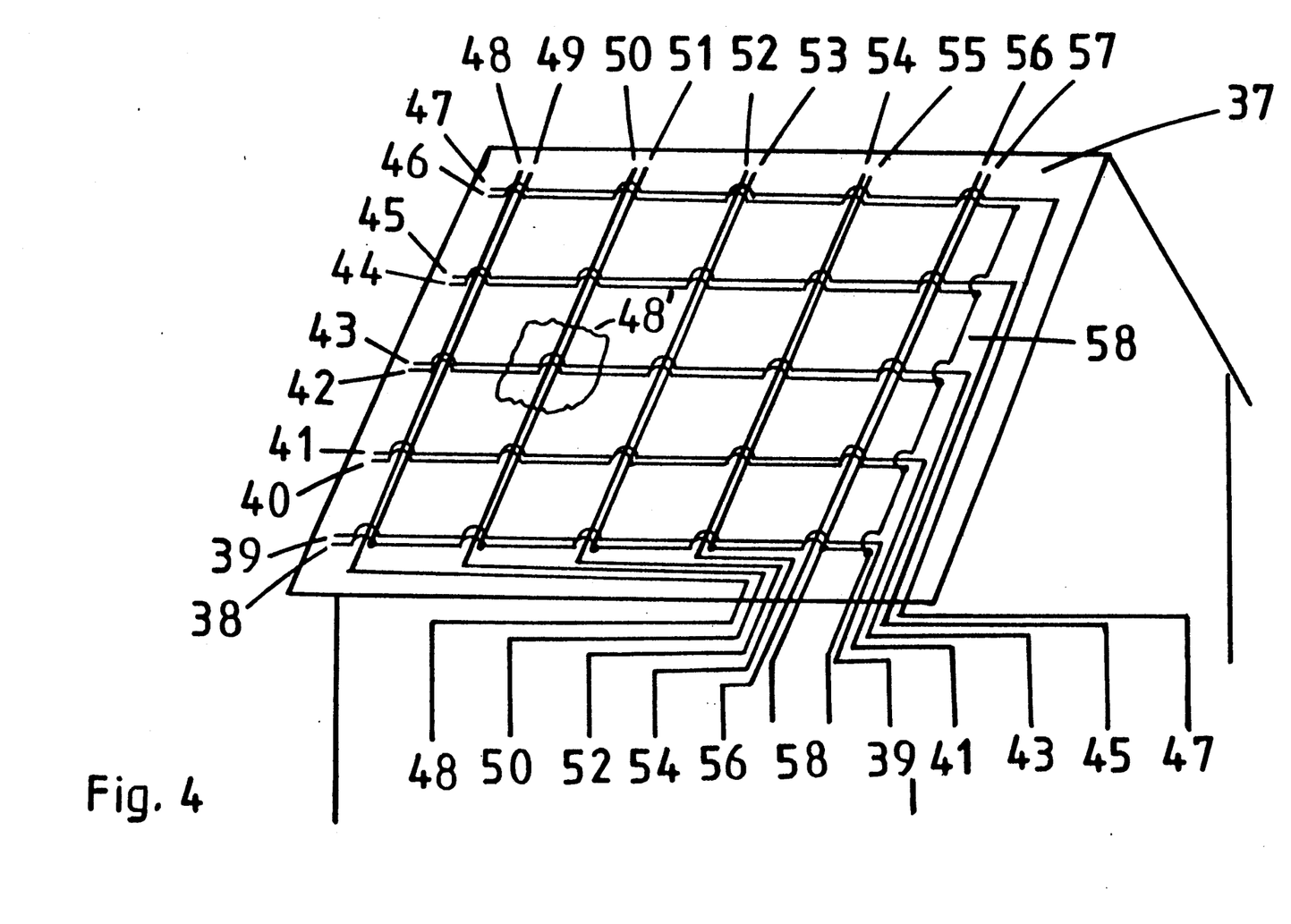
FIG. 4 shows a two wire detector mesh arrangement running both along and across one side of the roof to determine the position of the leak.

To locate the exact position of the leak, a combination of the leak detection systems employed in FIGS. 2 and 3 may be used. The combination of multiple sensing wires is what is referred to as a mesh leak detection system in the present invention. FIG. 4 shows a wire detection system with 5 pairs of horizontal detection wires and 5 pairs of vertical detection wires mounted on the roof (37). The following pairs of wires form the detection system: (38,39), (40,41), (42,43), (44,45), (46,47), (48,49), (50,51), (52,53) (54,55) and (56,57). The distance between the two wires in each pair, the distance between adjacent horizontal pairs and the distance between adjacent vertical pairs again are kept constant. One of the wires in each pair (38, 40, 42, 44, 46, 49, 51, 53, 55 and 57) is connected to a common wire (58) to simplify the wiring. The detection of the exact position of the leak is achieved by measuring separately the resistance between the following pairs: (38,39), (40,41), (42,43), (44,45), (46,47), (48,49), (50,51), (52,53), (54,55) and (56,57). If the plywood of the roof is dry and if there is no water leak, the resistances between the pairs will be high and the voltage across the sensing resistor will be low. In the leak detection, a detection circuit similar to that in FIG. 1 is used. Here the measurements of the voltages across individual wire pairs are made by connecting the sensing resistor, the dc power source and the sensing circuit to the pairs either manually or electronically. If water is present in region (48), the resistances between the pair (38,39), (40,41), (44,45), (46,47), (48,49), (52,53), (54,55) and (56,57) will be high. The resistances between pair (42,43) and pair (50,51) which are through the leak region (48) will be low. Therefore, the exact position of the leak on the roof can be found from the vertical position of the sensing wire pair (42,43) and the horizontal position of the sensing pair (50,51).

Figure 5:
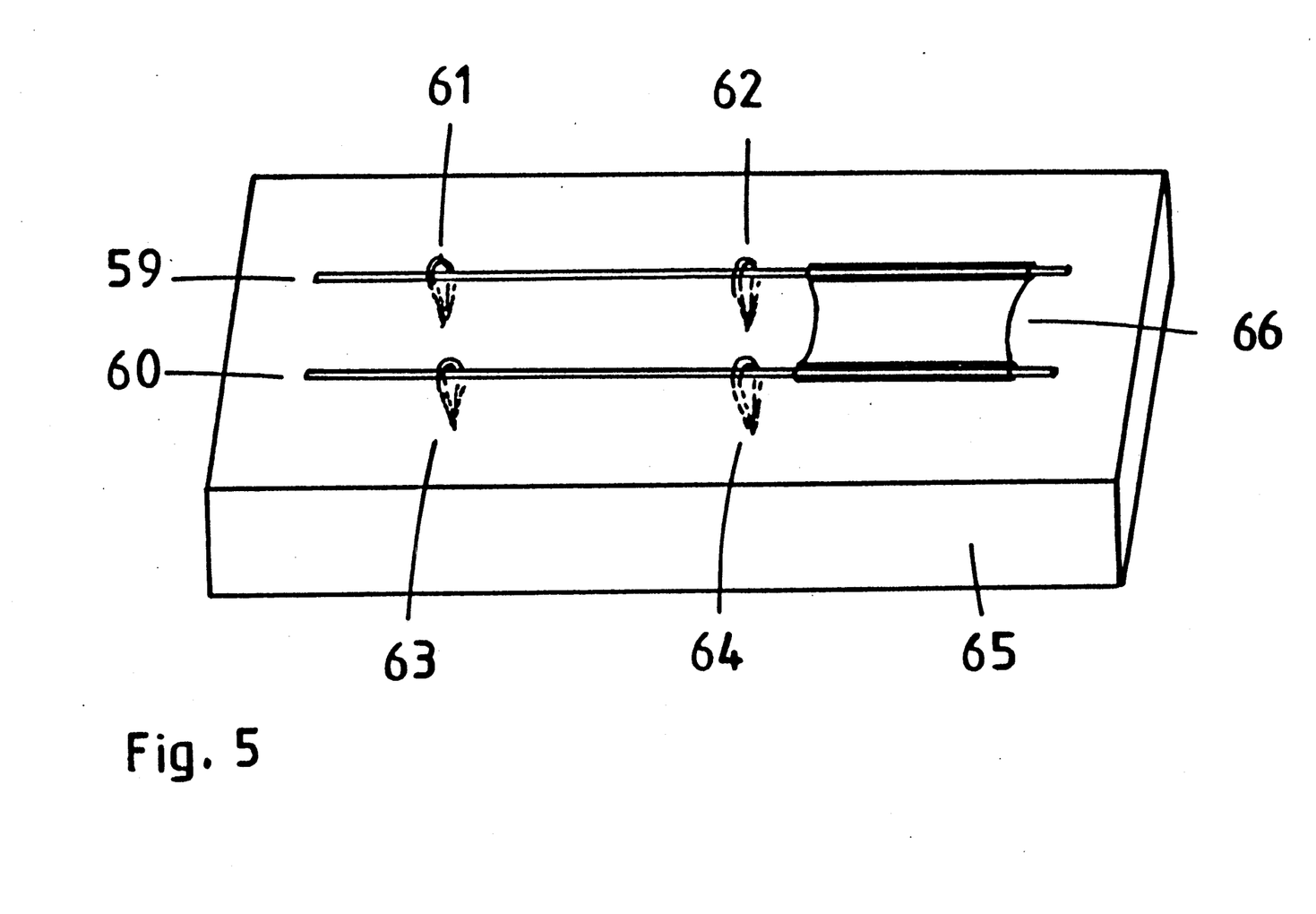
FIG. 5 shows a section of the sensing and common wires which are affixed to the plywood by conducting pins and separated by an insulating spacer.

In addition to maintaining the distance between the two wires of each pair and the distance between the adjacent pairs, the conduction pins (7) in FIG. 1 serve as probes and electrical contacts for water-soaked plywood. Under certain conditions, true leak may not be discovered with the two wire detector. This would be the case if the measurements were made after the water was absorbed by the plywood and the surface had dried. This would also be the case if intimate contact of the wires with the plywood was not made. With the conducting pins, the electrical contacts between the sensing wires and the plywood can be improved and the water content of the plywood can be probed. FIG. 5 shows the arrangement of the two sensing wires (59,60) each with two positioning metal pins (61,62), (63,64). The pins are forced into the plywood (65) so there will be an intimate contact between the two wires and the plywood. The metal pins improve the reliability of the leak sensing system. When water is present on the surface of the plywood, the pins ensure a reliable indication of the resistance between the two wires. When water is absorbed by the plywood and the surface is dry, the pins allows electrical current to flow from the sensing wire (59) through the wet plywood (65) to the other sensing wire (60).

Figure 6:
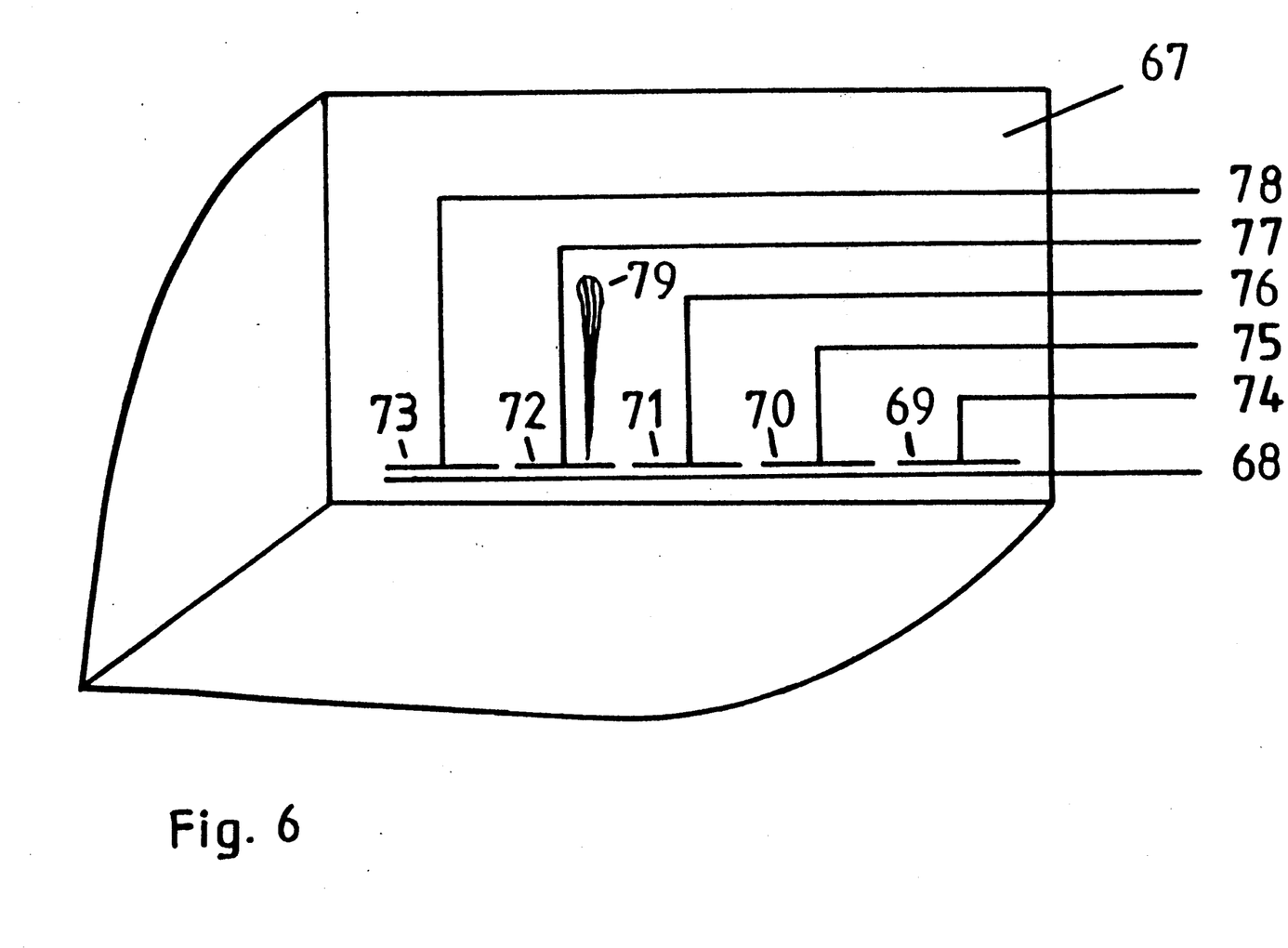
FIG. 6 shows a parallel two wire detector arrangement running across one side wall of a basement to determine the horizontal position of the leak in the basement wall.

The two wire leak detection system may also be used to detect leaks in the walls or floors of the dwellings and other buildings. FIG. 6 shows an arrangement for the detection of a leak in a wall (67) of a basement. One bare common conducting wire (68) is mounted on the surface of the wall. Five other bare sensing wires (69, 70, 71, 72 and 73) are mounted parallel to the common wire (68). Each of the sensing wires is connected to a signal wire (74, 75, 76, 77 and 78). The distance between the common wire (68) and each of the sensing wires is maintained to be constant so that the same voltage sensing circuit can be used by all of the sensing wires. To monitor a water leak in the wall, (67), a constant voltage is applied sequentially across the following pairs: (68,69), (68,70), (68,71), (68,72) and (68,73) and the current measured accordingly. If there is no water leak, the resistances between the two wires of the above sensing pairs will be high. No current will be detected. When water leaks in region (79) and spreads to the sensing wires (68,72), the resistance between the pair will be low. A finite current will flow. For pairs (68,69), (68,70), (68,71) and (68,73), the resistances will be high and no current will be detected. The system shown in FIG. 6 can be used to detect and to locate leaks in the wall without removing the entire insulation and decorations.

Figure 7:
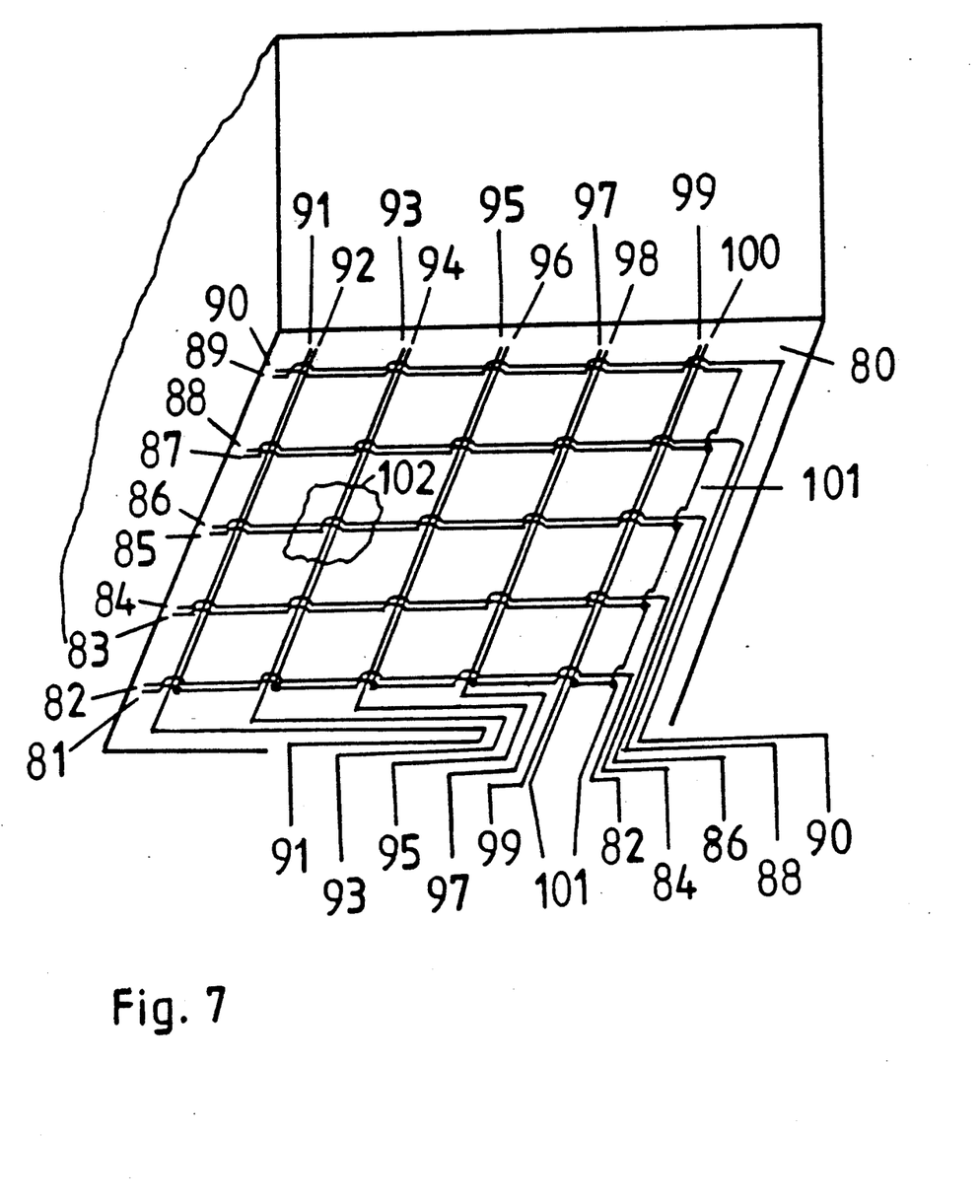
FIG. 7 shows a parallel two wire detector mesh arrangement running both along and across a basement floor to detect the position of leak.

To locate the exact position of a leak on a basement floor, a mesh leak detection system with multiple sensing wires similar to the one shown in FIG. 4 can be used. A wire detection system with 5 pair of horizontal wires and 5 pairs of vertical wires is shown mounted on the basement floor (80) in FIG. 7. The following pairs of wires form the detection system: (81,82), (83,84), (85,86), (87,88), (89,90), (91,92), (93,94), (95,96) (97,98) and (99,100). The distance between the two wires in each pair, the distance between adjacent horizontal pairs and the distance between adjacent vertical pairs are kept constant. One of the wires in each pair (81, 83, 85, 87, 89, 92, 94, 96, 98 and 100) is connected to a common wire (101) to simplify the wiring. The detection of the exact position of the leak is achieved by measuring separately the resistance between the following pairs: (81,82), (83,84), (85,86), (87,88), (89,90), (91,92), (93,94), (95,96), (97,98) and (99,100). A measuring circuit similar to that used in FIG. 1 is employed. If the floor is dry and if there is no water leak, the resistances between the above pairs will be high. The voltage across the sensing resistor will be low. The measurements of voltages across individual wire pairs are made by connecting the sensing resistor, the dc power source and the sensing circuit to the pairs either manually or electronically. If water is present in region (102), the resistances across the following pairs (81,82), (83,84), (87,88), (89,90), (91,92), (95,96), (97,98) and (99,100) will be high. The resistances between the two wires of pair (85,86) and the two wires of pair (93,94) through the leak region (102) will be low. Therefore, the exact position of the leak on the floor can be found from the vertical position of the sensing wire pair (85,86) and the horizontal position of the sensing pair (93,94).

EXAMPLE 1

Tin-coated bare copper wires with a diameter of 0.5 mm are mounted in pairs directly on the plywood both along and across a roof with a surface area of $20 \times 20$ ft$^2$. The distance between the two wires in each pair is kept at 1 cm by insulating plastic spacers. The length of the spacers is 2 cm and the distance between adjacent spacers is 30 cm. Each of the wires is held against the plywood by metal staple pins or conventional metal nails. The distance between adjacent pins is 10 cm. The length of the pins or the nails is about 6 mm. The distance between adjacent pairs is kept at 30 cm. One of the wires in each pair is connected to a common conducting wire which is connected in series with a sensing resistor with a resistance value of 10 kohm. The other wire in the pair is used for the sensing wire. Each horizontal sensing wire is electrically isolated from the vertical sensing wires and the vertical common wires using plastic insulation in the crossing regions. Each vertical sensing wire is also electrically isolated from the horizontal sensing wires and common wires using plastic insulation in the crossing regions. The number of pairs required for horizontal sensing is 21 and the number for vertical sensing is also 21. The sensing wire in each pair is connected to a power supply and a voltage sensing circuit. After the installation of the sensing and the common wires, tar paper and shingles are used to cover the plywood and the sensing wires. The power supply consists of a 1.5 volt dc source with a current limiting resistor. In order to operate the system safely, the dc voltage should not be too high (less than 10 volts). However, it should not be so small (greater 0.1 volt) that the correct leak detection is prevented by the precision of the voltage sensing circuit. The dc power source with the current limiting resistor is connected through a multiple position switch to the leak sensing wires. The switch position corresponds to the horizontal and vertical positions of the sensing wires. The two terminals of the voltage sensing resistor (resistance 10 kohm, rating 25 mW) are connected to the voltage sensing circuit which can measure a voltage as small as 1 mV. After the installation of the sensing wires and common wires, the roof is covered with tar paper then by shingles. To locate the leak, the power for the dc source and the sensing circuit is turned on and the switch position set for the first horizontal sensing wire. The voltage across the voltage sensing resistor is recorded. If the voltage across the sensing resistor is greater than 0.1 volt the leak should be present. A voltage less than 0.1 volt implies that the amount of moisture in or water on the plywood is small and a leak is unlikely. For example, when a section of 10 cm long sensing wire and common wire is soaked with water, the voltage across the sensing resistor will be about 0.5 volt. Therefore, the threshold value of 0.1 volt may be conveniently used to distinguish the presence of water leak. However, it should be noted that the above threshold value should be adjusted according to the conductivity of the rain water involved. The above process is repeated for all of the horizontal and the vertical sensing wires. From the positions of the switch, giving voltages greater than 0.1 volt, the location of the leak on the roof is determined. If all of the measurements show low voltages, then there is no leak at all and the roof is in a proper condition. Once the testing is complete, the power to the supply and the sensing circuit is turned off.

EXAMPLE 2

The same two-wire sensing arrangement on the plywood as in Example 1 except that the leak detection is achieved by an electronic switching circuit rather than a manual multiple position switch. This switching circuit consists of electronic switches, the position of which can be controlled by a preprogrammed chip. When the power is turned on, the switch is in a position for the first horizontal sensing wire pair. The voltage across the sensing resistor is measured and the measured voltage is displayed on a liquid crystal display. If the voltage exceeds 0.1 volt, the switch position is recorded by the electronic circuit and a warning message will also be displayed. The position of the switch is then set for the second horizontal wire pair and the measurement repeated. When all of the measurements are completed, the switch positions with voltages greater than 0.1 volt are displayed again as well as the actual positions of the leaks on the roof. Once the testing is complete, the power to the supply and the sensing circuit is turned off.

EXAMPLE 3

The same two-wire sensing arrangement on the plywood and the sensing switching circuit in Example 2 except that the sensing wires are equally spaced at intervals of 30 cm. The switching circuit consists of electronic switches the position of which can be controlled by a preprogrammed chip. When the power is turned on, the switch is in a position for the first pair of the horizontal sensing wires. The first wire is taken as the common wire and the second wire as the sensing wire. The voltage across the sensing resistor is measured and the measured voltage is displayed on a liquid crystal display. If the voltage exceeds 0.1 volt, the switch position is recorded by the electronic circuit and a warning message is displayed. The position of the switch is then set so that the second wire is taken as the common wire and the third one as the sensing wire and the measurement is repeated. When all of the measurements are completed for both the horizontal and vertical sensing wires, the switch positions with voltages greater than 0.1 volt are displayed as well as the actual positions of leaks on the roof. Once the testing is complete, the power to the supply and the sensing circuit is turned off.

EXAMPLE 4

The same two-wire sensing arrangement and sensing method in Example 2 except that the sensing wires and the common wires are installed on top of the tar paper and below the shingles or tar-sand mixture.

EXAMPLE 5

The same two-wire sensing arrangement and sensing method in Example 2 except that the sensing wires are installed in the peripheral regions of the roof within 100 cm of the edges. The probability of water leak is larger near the edges than in the central region. This type of detection may be sufficient for conventional houses.

EXAMPLE 6

The same two-wire sensing arrangement in Example 2 except that the sensing and the common wires are mounted directly on a cement floor. The measurements are carried out sequentially to locate the floor leak.

EXAMPLE 7

The same two-wire sensing method in Example 2 except that the only one common wire is mounted horizontally along the basement walls. Sensing wires of 100 cm length are mounted parallel to the common wire. The distance between the sensing wires and the common wire is 1 cm. The separation between two adjacent sensing wires is also 1 cm. The measurements are carried out sequentially to detect the leak from the basement walls.

EXAMPLE 8

The same two-wire sensing arrangement in Example 2 except that the voltage across the sensing resistor is used to indicate the length of the leak area. For example, the voltage across the 10 kohm sensing resistor with a 1.5 volt dc source will be 0.5 volt when the length of the leak area is 10 cm. As the length is increased to 20 cm, the voltage will be about 0.9 volt. The measured voltage thus can be used with a circuit having preloaded voltage versus length data to indicate the size of the leak area.

EXAMPLE 9

The same two-wire sensing method in Example 1 except that only the horizontal sensing wires and common wires are installed to detect the vertical position of the leak.

EXAMPLE 10

The same two-wire sensing method in Example 1 except that only the vertical sensing wires and common wires are installed to detect the horizontal position of the leak.

While the invention has been described with reference to tin-coated copper sensing and common wires, a manual switching circuit and an electronic switching circuit, the leak detection may well be achieved using sensing and common wires of other metallic materials. The measurements and display of voltages and thus the leak position may be made using instruments other than the ones cited here. For instance an intelligent microcomputer might be used. In addition, the dimensions of the wires, spacings and the lengths may be adjusted according to the size of the roof and desired precision. Furthermore, the sensing and the common wires may be mounted so that they make an angle with the edge of the roof. The leak position can be displayed using the actual coordinates of the sensing wires or light spots on a screen. The same resistance detection method may also be applied using an ac power source and an ac voltage sensing circuit. The resistance value of the sensing resistor and the voltage needed to distinguish the leak may also vary. For example, the ion concentration in rain water near an industrial region may be higher than that in a remote region. Thus the resistance between the two wires in a sensing pair may have to be lower and the threshold voltage for determining the leak may have to be greater than for the remote area.

The embodiments of the invention in which an exclusive property or privilege is claimed are defined as follows:

1. A method for detecting and locating a water leak or leaks in a roof of a dwelling or a building, said method comprising the steps of:

mounting parallel bare horizontal conducting sensing wires and common wires and vertical conducting sensing wires and common wires on plywood both along and across the said roof, fixing said conducting sensing wires and common wires on said plywood with conducting pins or nails, maintaining a constant distance between said sensing wire and common wire in pair, insulating said horizontal conducting sensing wires from said vertical conducting sensing wires and common wires, insulating said vertical conducting sensing wires from said horizontal common wires and said horizontal sensing wires, mounting shingles or tar/sand papers on said roof, measuring electrical resistance, during detection, across each pair of said horizontal conducting sensing wires and common wires, measuring electrical resistance, during detection, across each pair of said vertical conducting sensing wires and common wires, locating position of said water leak from positions of said horizontal conducting sensing wires and vertical conducting sensing wires with the value of said resistance smaller than a threshold value.

2. A method as defined in 1 wherein the said leak is detected by measuring the voltage across a sensing resistor, connected in series with the said sensing wire, due to a current flow through water, through the said sensing wire and common wire.

3. A method as defined in 1 wherein the said leak is further detected by said voltage across said sensing resistor due to a current flow through water-soaked construction materials like the said plywood.

4. A method as defined in 1 wherein said threshold value is adjusted according to ion concentration or pH value in said leak water.

5. A method as defined in 1 wherein said resistance measurements are performed manually and the said sensing wire for said measurements is selected by a multiple position electrical switch.

6. A method as defined in 1 wherein said resistance measurements are further performed using a pre-programmed electronic chip and the results of said resistance measurements displayed on an electronic display.

7. A method as defined in 1 wherein said horizontal conducting sensing wires, common wires, vertical sensing wires and common wires are mounted in peripheral regions of said roof to simplify said leak detection.

8. A method as defined in 1 wherein said voltage across the said sensing resistor is further used to indicate the length of area of said water leak.

9. A method for detecting and locating a water leak or leaks in walls of a dwelling or a building, said method comprising the steps of:

mounting parallel bare horizontal conducting sensing wires and common wires across the said walls, maintaining a constant distance between said horizontal sensing wire and common wire in pair, maintaining a constant distance between adjacent said horizontal sensing wires, insulating said horizontal conducting sensing wires from said common wires, installing plywood and other construction materials to complete the said walls, measuring electrical resistance across each pair of said horizontal conducting sensing wires and common wires, locating position of said water leak from positions of said horizontal conducting sensing wires with the value of said resistance smaller than a threshold value.

10. A method as defined in 9 wherein the said leak is further detected by measuring the voltage across a sensing resistor, connected in series with the said sensing wire, due to a current flow through water through the said sensing wire and common wire.

11. A method as defined in 9 wherein the said leak if further detected by said voltage across said sensing resistor due to a current flow through water-soaked construction materials like cement.

12. A method as defined in 9 wherein said threshold value is adjusted according to ion concentration of pH value in said leak water.

13. A method as defined in 9 wherein said resistance measurements are performed manually and the said sensing wire for said measurements is selected by a multiple position electrical switch.

14. A method as defined in 9 wherein said resistance measurements are further performed using a pre-programmed electronic chip and the results of said resistance measurements displayed on an electronic display.

15. A method as defined in 9 wherein said horizontal conducting sensing wires and common wires in peripheral regions of said roof to simplify said leak detection.

16. A method as defined in 9 wherein said voltage across the said sensing resistor is further used to indicate the length of area of said water leak.

17. A method for detecting and locating a water leak or leaks in a floor of a dwelling or a building, said method comprising the steps of:

mounting parallel bare horizontal conducting sensing wires and common wires and vertical conducting sensing wires and common wires on cement both along and across the said floor, fixing said conducting sensing wires and common wires on said floor with conducting pins or nails, maintaining a constant distance between said sensing wire and common wire in pair, insulating said horizontal conducting sensing wires from said vertical conducting sensing wires and common wires, insulating said vertical conducting sensing wires from said horizontal common wires and said horizontal sensing wires, mounting plywood and carpet to complete said floor, measuring electrical resistance, during leak detection, across each pair of said horizontal conducting sensing wires and common wires, measuring electrical resistance, during leak detection, across each pair of said vertical conducting sensing wires and common wires, locating position or said water leak from positions of said horizontal conducting sensing wires and vertical conducting sensing wires with the value of said resistance smaller than a threshold value.

18. A method as defined in 17 wherein the said leak is further detected by measuring the voltage across a sensing resistor, connected in series with the said sensing wire, due to a current flow through water through the said sensing wire and common wire.

19. A method as defined in 17 wherein the said leak is further detected by said voltage across said sensing resistor due to a current flow through water-soaked construction materials like the said cement.

20. A method as defined in 17 wherein said threshold value is adjusted according to ion concentration or pH value in said leak water.

21. A method as defined in 17 wherein said resistance measurements are performed manually and the said sensing wire for said measurements is selected by a multiple position electrical switch.

22. A method as defined in 17 wherein said resistance measurements are further performed using a pre-programmed electronic chip and the results of said resistance measurements displayed on an electronic display.

23. A method as defined in 17 wherein said horizontal conducting sensing wires, common wires, vertical sensing wires and common wires are mounted in peripheral regions of said floor to simplify said leak detection.

24. A method as defined in 17 wherein said voltage across the said sensing resistor is further used to indicate the length of area of said water leak.

* * * * *